United States Patent [19]

Newton

[11] 4,402,011
[45] Aug. 30, 1983

[54] VERTICAL SYNC COUNTER WITH AUTOMATIC RECOGNITION OF TV LINE STANDARD

[75] Inventor: Anthony D. Newton, Geneva, Switzerland

[73] Assignee: Motorola, Inc., Schaumburg, Ill.

[21] Appl. No.: 312,564

[22] Filed: Oct. 19, 1981

[51] Int. Cl.³ .............................................. H04N 5/10
[52] U.S. Cl. ..................................... 358/154; 358/148; 358/153
[58] Field of Search ............... 358/140, 148, 150, 153, 358/154

[56] References Cited

U.S. PATENT DOCUMENTS

| | | | |
|---|---|---|---|
| 4,227,214 | 10/1980 | Morito et al. | 358/154 X |
| 4,238,769 | 12/1980 | Rzeszewski | 358/154 |
| 4,303,940 | 12/1981 | Ciciora | 358/147 X |
| 4,349,839 | 9/1982 | McGinn | 358/148 |

Primary Examiner—Robert L. Richardson
Attorney, Agent, or Firm—Walter W. Nielsen

[57] ABSTRACT

A TV timebase circuit includes a vertical sync counter in the form of a ten-bit ripple-through counter. Additional logic circuitry including a pair of divide-by-four counters, a latch, a D flip-flop, and associated AND, NAND, and invertor gates are also provided. The circuit is responsive to a multiple of the horizontal frequency and to vertical sync pulses and is capable of automatic recognition of 525 or 625 line standard. The logic includes a mechanism for locking out the vertical counter's 525 count when operating in the 625 mode. The latch, in association with one of the divide-by-four counters serves a "fly wheel" sync function, whereby a predetermined number of "matches" must be recognized to lock the circuit into a given mode, and whereby a predetermined number of "mis-matches" must occur to drop the circuit operation from the locked-in mode. Several outputs are taken off the vertical counter to operate ramp drive and blanking functions of the TV vertical sweep generator. An output representative of the particular line standard being decoded may be used to provide chrominance decoding information and picture height control information.

An alternative embodiment capable of recognizing any given TV line standard comprises a register which is loadable with the line standard number, which in turn is provided from the vertical counter cumulative count between successive vertical sync pulses, the vertical counter being reset by each vertical sync pulse. Comparison logic is provided for locking the counter circuit onto a given line standard after a predetermined number of successful matches have occurred between the contents of the register and the vertical counter count at the moment of reset by the vertical sync pulse.

13 Claims, 9 Drawing Figures

VERTICAL SYNC COUNTER WITH AUTOMATIC RECOGNITION OF TV LINE STANDARD

CROSS REFERENCE TO RELATED APPLICATION

U.S. Ser. No. 220,610, now U.S. Pat. No. 4,349,839 entitled "Vertical Sync Counter Having Multi Modes of Operation For Different TV Systems", filed Dec. 29, 1980 and assigned to the assignee of the present invention.

BACKGROUND OF THE INVENTION

This invention relates to a vertical sync counter for a television receiver and more particularly to a vertical sync counter capable of automatically recognising different TV line standards corresponding to TV systems having different numbers of lines per picture.

Some TV receivers include both a vertical oscillator and a horizontal oscillator. However, for reasons of economy and manufacturing simplicity, some TV receivers have the vertical oscillator replaced with a counter that is driven by the output of the horizontal oscillator. This is possible because of the fixed relationship between the vertical and horizontal frequencies. The number of lines in a TV picture varies throughout the world, but in general there are two main line standards—525 lines or 625 lines. For example, in the United States the N.T.S.C. standard applies wherein each TV picture contains 525 lines. In Europe the P.A.L. and S.E.C.A.M. standards are widely used, each TV picture containing 625 lines. There is a growing commercial need for TV receivers to be capable of recognising and receiving different line standards, particularly with the increased use of video recording and direct satellite broadcasting. Prior art multiple standard TV receivers have used separate decoding circuits for decoding picture information being transmitted at different line standards. However these receivers are costly to manufacture and difficult to adjust and maintain. The problem solved by the present invention is the automatic recognition of different TV line standards.

Accordingly, one object of this invention according to a preferred embodiment thereof is to provide TV circuitry including a vertical sync counter capable of automatically distinguishing between two different TV line standards.

A further object of this invention according to an alternative embodiment is to provide TV circuitry including a vertical sync counter capable of automatically adjusting to any given TV line standard.

BRIEF SUMMARY OF THE INVENTION

These and other objects are achieved in accordance with a preferred embodiment of the invention by providing a vertical counter for a TV receiver having a horizontal oscillator for providing horizontal sync pulses which are coupled to at least such counter to be counted thereby, the counter being adapted to provide output pulses to a vertical sweep generator, the counter being adapted to receive a vertical sync pulse, such sync pulse occurring in at least one of two frequencies at any given moment, wherein the vertical counter is characterized by having a first mode of operation wherein the counter counts to a first predetermined number of horizontal pulses corresponding to reception of the vertical sync pulse at a first frequency, after which the vertical counter is reset, and having at least a second mode of operation wherein the counter counts to a second predetermined number of horizontal pulses corresponding to reception of the vertical sync pulse at a second frequency, after which the vertical counter is reset, the vertical counter changing automatically between the first and second modes of operation.

BRIEF DESCRIPTION OF DRAWINGS

The invention is pointed out with particularity in the appended claims. However, other features of the invention will become more apparent and the invention will be best understood by referring to the following detailed description in conjunction with the accompanying drawings in which:

DESCRIPTION OF PREFERRED EMBODIMENT

Before embarking on a detailed discussion of the invention, it may be helpful to briefly review basic television principles. A complete TV picture appears on the TV screen a given number of times per second and consists of two interlaced frames. Between each frame there is an interval during which the screen is dark. Each TV frame, however, is not projected as a complete unit but is created by varying the brightness of a moving spot of light. That is, the picture tube contains an electron gun which generates an electron beam which moves very rapidly back and forth across a phosphor-coated screen. By changing the strength of the electron beam different amounts of light are produced in different places. More exactly, the electron beam is focused into a fine point that moves from the upper left-hand corner in a straight nearly horizontal line to the right side of the screen.

After each movement from left to right, the beam intensity is reduced so that no light is produced during the return motion from right to left. After any given line is painted, the beam is moved down an increment on the tube face to the next line position. While the motion of the electron beam is called "scanning", the electron actions involved are generally referred to as "sweeping" and we speak of a horizontal sweep frequency of approximately 15,750 cycles per second for a line standard having 525 lines per picture.

It should be obvious that there must be some synchronization between the image seen by a remote television camera and that which is ultimately shown on the TV screen. If, for example, the receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the electron beam must be turned off during the time in which it returns to its starting place. This return time is often referred to as the retrace or flyback period and is approximately 12 microseconds long for each line (the horizontal flyback), but is considerably longer for the period when the beam returns from the bottom to the top of the screen (the vertical flyback period).

Figure 1:
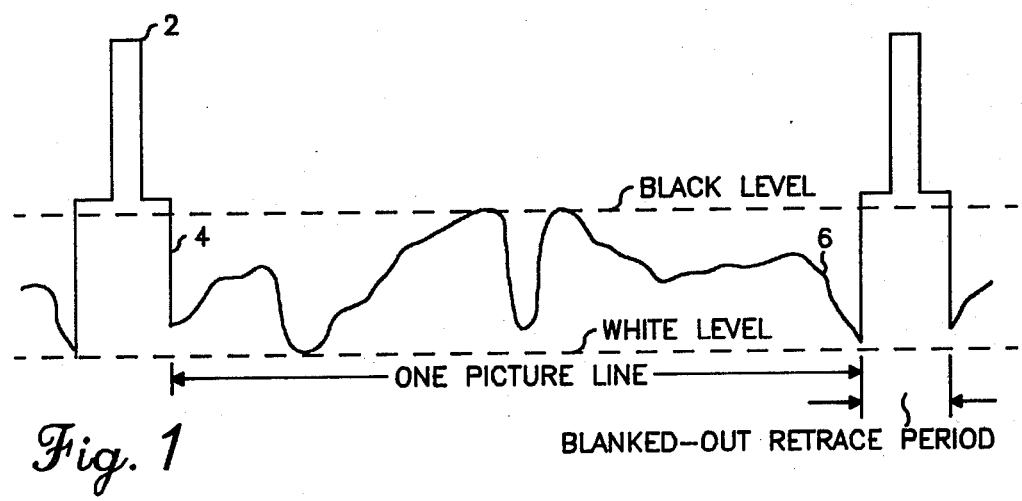
FIG. 1 and FIG. 2 illustrate a composite video signal received by a TV receiver.

FIG. 1 illustrates a black and white video signal including the horizontal synchronization pulses 2 and the horizontal blanking pulse 4. Interposed between successive horizontal blanking pulses is the actual black and white video signal 6 corresponding to one picture line.

Figure 2:
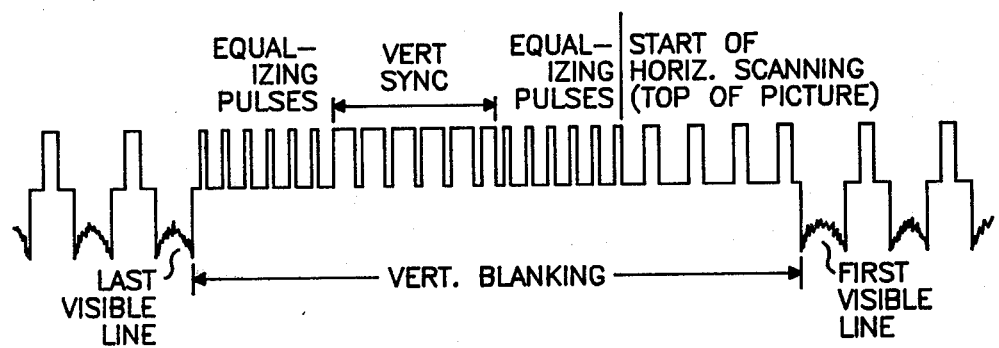

Referring to FIG. 2, the start of each field of vertical scanning is dictated by a vertical synchronization or vertical blanking pulse which lasts much longer than the horizontal synchronization pulses. To avoid losing horizontal synchronization during the vertical flyback or blanking period, the horizontal synchronization pulses are superimposed on the vertical blanking pulse. The first six pulses are very narrow and are referred to as equalizing pulses.

Next, there are six wide pulses which comprise the actual vertical synchronization pulse separated by the horizontal synchronization period. This is followed by an additional six equalizing pulses and then four regular horizontal synchronizing pulses that start at the top of the picture. Note that the vertical blanking period extends through this time and darkens the screen while the beam moves from bottom to top and covers the first four lines of the picture. It will be understood by one of ordinary skill in the art that the actual number of equalising pulses, vertical synchronization pulses, and horizontal synchronization pulses occurring during the vertical blanking period may vary according to the particular line standard.

Figure 3:
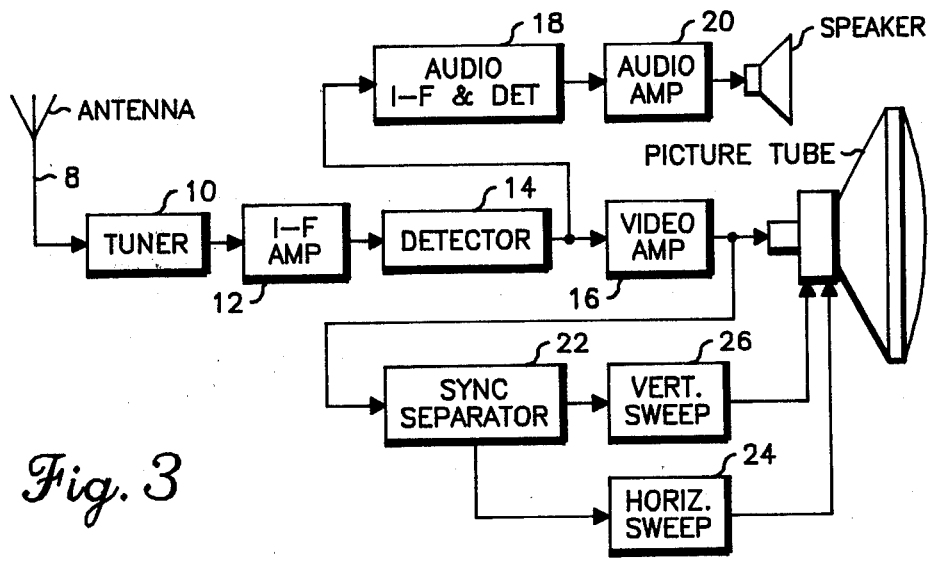
FIG. 3 shows a block diagram of a basic prior art TV receiver.

FIG. 3 shows a blocking diagram of a basic prior art black and white TV receiver. From the antenna, a transmission line 8 brings all signals received by the antenna to tuner 10 whose function it is to select the desired band of frequencies and reject all others. The tuner passes only the desired signal to the IF amplifier 12.

Television IF amplifier 12 includes a plurality of IF stages which amplify the IF signals. To prevent overloading and to minimize picture changes during fading of the transmission signal, automatic gain control is used to control the amplification of the IF signal.

The output of IF amplifier 12 is applied to a detector 14 which removes the amplitude modulated video signals and applies it to video amplifier 16. The sound signal is removed, amplified, clipped and limited in audio section 18. The output of audio detector 18 is applied to audio amplifier 20 which is similar to audio amplifiers found in radio receivers. The output of the audio amplifier is applied to the speaker.

Video amplifier 16 requires more bandwidth than audio amplifier 20. This is accomplished using special peaking circuits for the high and low frequency response. The output of video amplifier 16 is applied to the picture tube and to a sync separator 22 which is unique to television receivers. As described earlier, the horizontal and vertical synchronization pulses appear on top of their respective blanking signals which are sandwiched between lines of picture signal. The sync separator clips the synchronization pulses off the composite video signal after the signal has been amplified in video amplifier 16. Two separate filters may be employed to separate the vertical from the horizontal synchronization pulses. For example, a high pass filter would permit only the horizontal synchronization pulses to reach horizontal sweep section 25 while the vertical pulses could be passed through a low pass filter to the vertical sweep section 26.

The vertical sweep section generates the actual signals which pass through the deflection yoke of the picture tube to move the electron beam up and down. Similarly, the horizontal sweep section is responsible for moving the electron beam across the tube.

Figure 4:
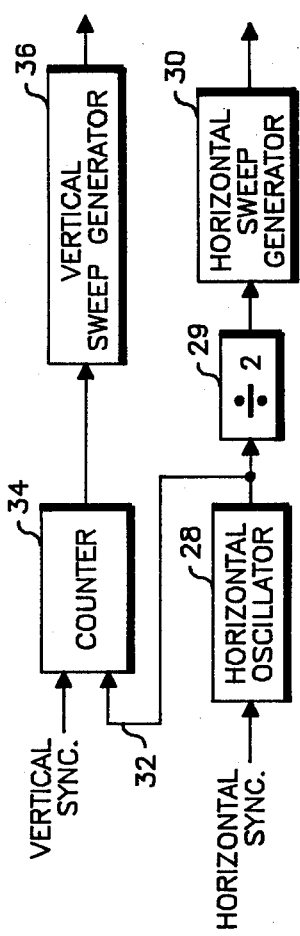
FIG. 4 shows in more detail a portion of the horizontal and vertical sweep portions of the typical TV receiver shown in FIG. 3.

Referring now to FIG. 4, it is seen that the vertical and horizontal sweep systems of a TV receiver may include a free-running horizontal oscillator 28 the output of which is coupled to a horizontal sweep generator 30 after being divided in half by a divide-by-two circuit 29. The horizontal oscillator 28 output is also coupled as an input to a vertical counter 34 by way of a lead 32. The input to the free-running horizontal oscillator 28, in the presence of a received TV signal, is the horizontal sync signal. In the absence of a vertical sync pulse applied thereto which is extracted from the received TV signal, the vertical counter 34 will keep counting up to a predetermined upper count limit which in a preferred embodiment is slightly greater than the highest expected number of lines in each frame. In the preferred embodiment shown in FIGS. 5A–5B, an upper count limit of 768 is provided by merely tying the outputs of the "256" and "512" stages of counter 60 back through an AND gate (not shown) as an additional input to AND gate 90 whose output is the reset lead 96 to counter 60. The reason for providing an upper count limit is to prevent too low a frame rate.

A lower count limit of 512 is also provided by tying the output of the "512" stage of counter 60 back over lead 97 to AND gate 90 in order to prevent too high a frame rate which might damage the television tube or give undesirable visual effects under abnormal transmission conditions. Referring again to FIG. 4, upon counting up to the predetermined upper count limit, the vertical counter 34 will automatically reset and provide a vertical output pulse to a vertical sweep generator 36. The output of the vertical sweep generator 36 and the horizontal sweep generator 30 is applied to the picture tube (FIG. 3) to provide a raster scan thereon. The presence of the vertical and horizontal sync pulses from a received TV signal enable the picture on the picture tube to be synchronized with the picture being transmitted in a well known manner.

Figure 5B:
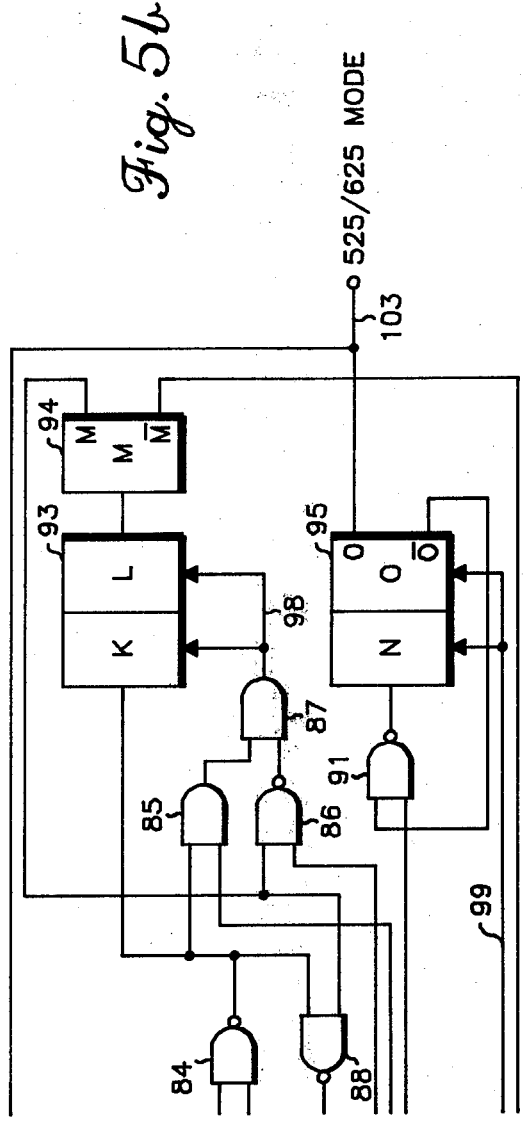
FIG. 5A and FIG. 5B together illustrate a logic diagram for the vertical sync counter and associated logic in accordance with a preferred embodiment of the invention.
Figure 5A:
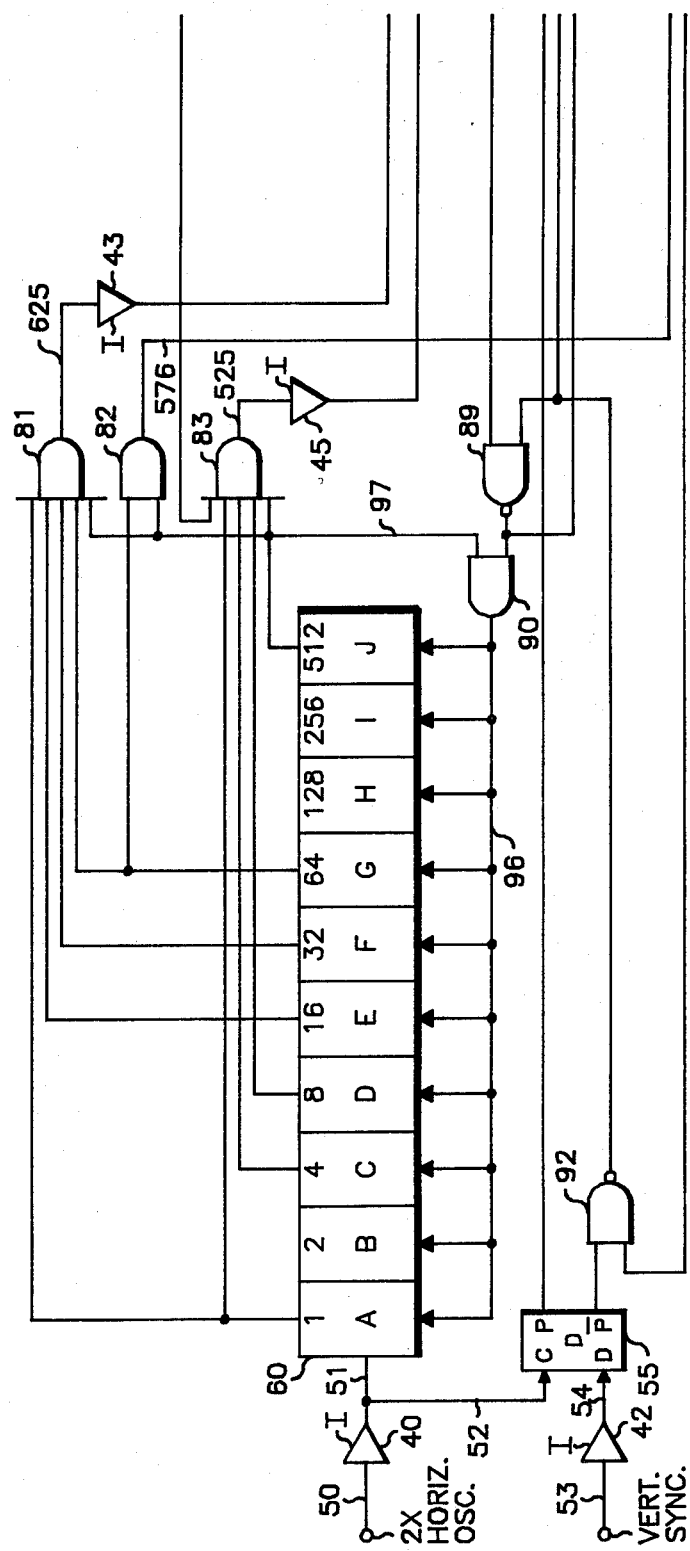

Referring now to FIGS. 5A and 5B a vertical sync counter 60 in accordance with a preferred embodiment of the present invention includes ten flip-flops A–J, interconnected in a well known manner.

Counter 60 counts pulses received at twice the horizontal oscillator frequency applied thereto by way of lead 50, inverter 40, and lead 51. A "D" type flip-flop 55 has its C input coupled to receive the inverse of the 2× horizontal oscillator pulses over lead 52 outputted from inverter 40. The D input of flip-flop 55 receives the vertical sync pulses provided by a received TV signal by way of lead 53, inverter 42, and lead 54. The operation of the D flip-flop 55 is such that its P output is equal to the logic level appearing on its D input at each negative-going transition of the 2× horizontal pulse input at C.

Divide-by-four circuit 93 and latch circuit 94, together with their associated logic gates, perform a threshold or flywheeling function with respect to the synchronizing of vertical sync counter 60 to the vertical sync pulses, in a manner which will be explained below. Divide-by-four circuit 93 is implemented in well known fashion as is latch 94. Divide-by-four circuit 93 is reset by means of a positive-going reset pulse over head 98. Latch 94 may be thought of as an additional divide-by-two stage of divide-by-four circuit 93; however, latch 94 does not have a reset lead, so that its output M assumes a high logic level each time stage L of divide-by-four circuit 93 makes a high-to-low transistion, i.e. everytime divide-by-four circuit 93 reaches a count of 4.

Divide-by-four circuit 95 performs a discriminator function in that it alters the overall counter operation depending upon whether a 525 or 625 line standard is being received, as will be explained in greater detail below. Divide-by-four circuit 95 is implemented in well known fashion, and is reset over lead 99.

AND gates 81–83 generate high logic level signals when the vertical sync counter 60 attains counts of 625, 576, and 525 respectively. For example, AND gate 81 goes high only when counter stages A, E, F, G and J are all high. The output of AND gate 81 is inverted by inverter 43 and forms one input to NAND gate 84. The output of AND gate 83 is inverted by inverter 45 and forms the other input to NAND gate 84. The output of NAND gate 84 is applied as an input to divide-by-four circuit 93, as an input to AND gate 85, and as an input to NAND gate 88.

The P output of D flip-flop 55 forms one input to NAND gate 86. The M output of latch 94 forms the other input to NAND gate 86 as well as an input to NAND gate 88. The $\overline{P}$ output of D flip-flop 55 forms one input to NAND gate 92, the other input of which is the M output of latch 94. The NAND gate 82 output forms one input to NAND gate 89 and one input to AND gate 85. The outputs of AND gates 85 and NAND gate 86 form the two inputs to AND gate 87, the output of which forms the reset lead 98 to divide-by-four counter 93. The output of NAND gate 88 forms an input to NAND gate 89, the output of which forms an input to AND gate 90. The 512 output of counter 60 forms the other input to AND gate 90, the output of which forms the reset lead 96 to counter 60.

The output of NAND gate 89 also forms an input to NAND gate 91. The $\overline{O}$ output of divide-by-four circuit 95 forms the other input to NAND gate 91, the output of which represents the input to the N stage of divide-by-four circuit 95. The O output of divide-by-four circuit 95 forms an input to AND gate 83.

The circuit shown in FIGS. 5A and 5B represents a Boolean logic diagram of the vertical sync counter of the present invention. It should be clear to one of ordinary skill in the art that the present invention may be implemented either with discrete components or in integrated circuit form using any appropriate circuit technology such as I²L, T²L, ECL, MOS, CMOS or the like. A preferred embodiment of the present invention was implemented in integrated circuit form using I²L logic, a logic diagram of which is given by FIG. 6.

Figure 6:
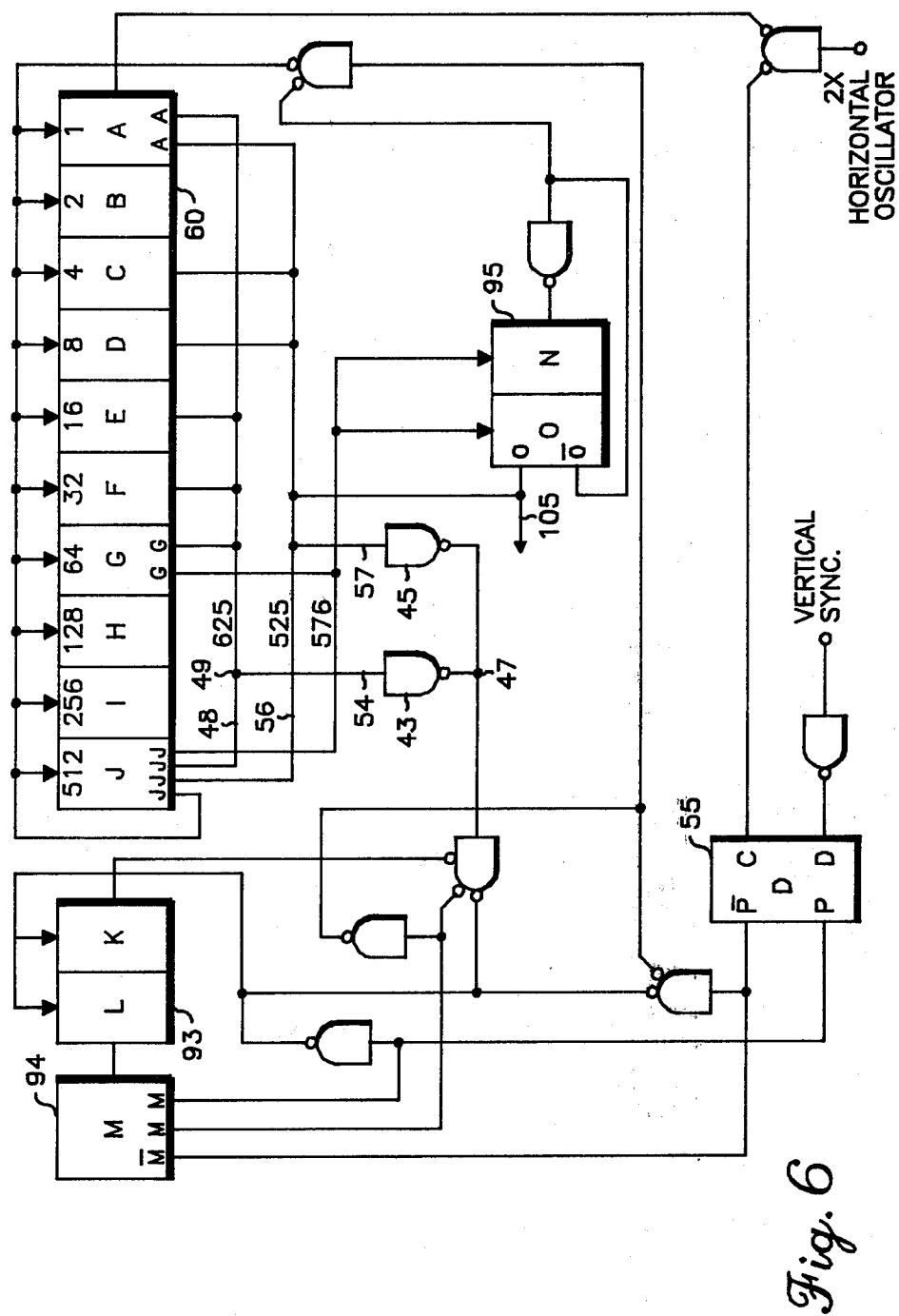
FIG. 6 illustrates an I$^2$L logic implementation of the vertical sync counter and associated logic in accordance with a preferred embodiment of the invention.

FIG. 6 shows an I²L implementation of the circuit illustrated in FIGS. 5A and 5B in Boolean logic form. The circuit elements appearing in FIG. 6 which perform the same logic function as those appearing in FIGS. 5A and 5B are given in the same reference numerals. The I²L circuit implementation will be apparent to one of ordinary skill in the art. In general, the basic logic gate in an I²L circuit implementation is an inverter with open collector multiple outputs. An output of one or more gates can be connected together to the input of another gate similar to the way that "wired OR" functions can be achieved with open collector TTL.

It will be perhaps easier to understand the I²L equivalent of the Boolean logic shown in FIGS. 5A and 5B by reference to a specific portion of the I²L circuit. Let us consider lead 48 of FIG. 6, which provides the 625 output lead of counter 60. The outputs of individual stages A, E, F, G and J are tied together at point 49. Each of these outputs represents a transistor collector, which collectors are tied together at point 49. A high signal level is passed over lead 54 to inverter 43 only if the outputs of stages A, E, F, G and J are all high. This corresponds in a Boolean logic sense to AND gate 81 in FIG. 5A. By analogy a high signal level representing the 525 output is generated over lead 57 to inverter 45 only if stages A, C, D and J are all high, and output O is also high. This AND function corresponds logically to AND gate 83 in FIG. 5A. With reference to the outputs of inverters 43 and 45 in FIG. 6, these are connected at point 47, which represents a "wired OR" function, corresponding to AND gate 84 in FIG. 5B. To the everyday practioner the Boolean logic operation of the I²L implementation shown in FIG. 6 should be readily apparent.

OPERATION OF PREFERRED EMBODIMENT

The operation of the preferred embodiment in automatically distinguishing between 525 and 625 line standards will now be described.

Figure 7:
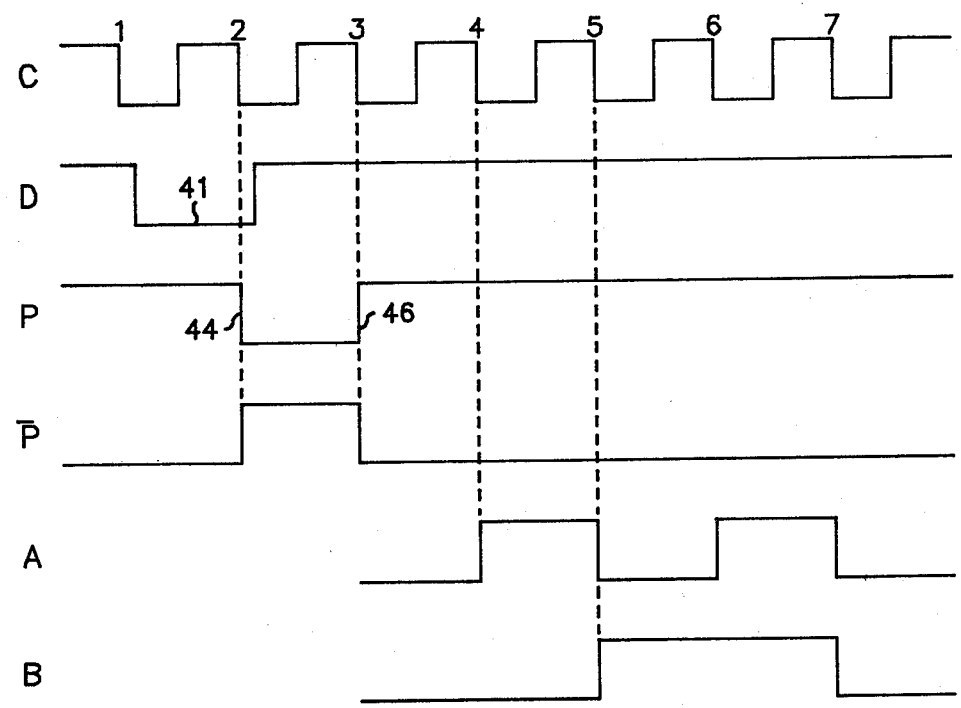
FIG. 7 illustrates a timing diagram for explaining the operation of a preferred embodiment of the invention.

As an aid to understanding the operation of the preferred embodiment shows in FIGS. 5A and 5B, let us first consider the effect of the 2× horizontal oscillator clock pulses on at least the A and B stages of vertical sync counter 60. Let us consider further the combined effect of the clock pulses at the C input and the vertical sync pulse at the D input upon the P output of D flip-flop 55. By reference to FIG. 7 the pulse train applied to the C input of D flip-flop 55 (equivalent to the inverse of the 2× horizontal oscillator signal) is shown at the top in the form of a series of regularly spaced ON and OFF states, the high-to-low transitions of which being numbered 1–7. Recalling the operation of D flip-flop 55, the high-to-low transitions of the C signal latch the P output of the same logic level as that appearing at the D input at the moment of the high-to-low C transition. The second line down in FIG. 7 shows the signal level appearing at the D input to D flip-flop 55. The segment 41 of the D signal represents the inversion of the received vertical sync pulse, and it will be noted that the vertical sync pulse does not necessarily occur synchronously with the C pulse train.

The next two lines in FIG. 7 represent the P and $\overline{P}$ signals, respectively. The P signal makes a high-to-low transition at 44, since the D signal is low when the C signal makes its high-to-low transition 2. Signal P returns high at 46, since signal D is again high at this time.

FIG. 7 shows the relationship between stages A and B of counter 60 and the C pulses to be such that stage A changes state with every falling transition of the C signal. The B stage changes state with every 2 transitions of the A stage, i.e. with every falling transition of the A stage. The C stage changes state every 4 transitions of the A stage, and this carries on by analogy down to the J stage which changes state every 512 falling transitions of the A stage.

Whether the vertical sync counter 60 is operating under a 525 line standard or a 625 line standard, the circuit operation initially occurs in a so-called Sync Pulse Reset Mode during which mode counter 60 is reset directly by the vertical sync pulses. When 4 successive vertical sync pulses of the same line standard (i.e. 525 or 625) have been received, the operation of the circuit changes to the so-called Countdown Reset Mode wherein counter 60 is reset by its having attained a count of 525 or 625 depending upon whether it is operating in the 525 or 625 line standard, respectively.

The operation of the circuit in the Sync Pulse Reset Mode when receiving a 525 line standard will now be described. This mode corresponds to a situation where the circuit is changing over from receiving 625 line standard to 525 line standard, or to a situation where counter 60 has lot synchronization with the vertical sync pulse for at least a succesion of 4 vertical sync pulses, or to a situation where the circuit is attempting to gain synchronization with the vertical sync pulse when the TV receiver is first turned on. Since the circuit is operating in the Sync Pulse Reset Mode the M output of latch 94 is low. The M output of latch 94 is always low for the Sync Pulse Reset Mode and is always high when the circuit is in the Countdown Reset Mode.

Let us assume that the output O of divide-by-four circuit 95 is low, indicating that the circuit was previously operating in response to a 625 line standard. The output O of divide-by-four circuit 95 is always high when the circuit is operating in response to a 525 line standard and it is always low when the circuit is operating in response to a 625 line standard.

The low level M output of latch 94 means that the $\overline{M}$ output is high, which output is applied to NAND gate 92. When the vertical sync pulse makes its low-to-high transition, such pulse is inverted by inverter 42 to provide the D signal as shown on the second line of FIG. 7. At the falling transition of C pulse 2 (FIG. 7) the $\overline{P}$ output of D flip-flop 55 goes high, and the output of NAND gate 91 accordingly goes low. Since the M output of latch 94 is low, the output of NAND gate 88 is high. Thus when the output of NAND gate 92 goes low, the output of NAND gate 89 goes high. We will assume that counter 60 has attained a count of at least 512 at the time the vertical sync pulse is received on line 53. Therefore AND gate 90 will be enabled and generate a reset pulse to each stage A–J of counter 60 over reset lead 96. Thus we see that when operating in the Sync Pulse Reset Mode counter 60 is reset by the vertical sync pulse.

To understand how the divide-by-four circuit 95 changes state to correspond to the receipt of a 525 line standard, it will be appreciated that after receipt by the circuit of 4 consecutive sync pulses at lead 53, NAND gate 89 will have generated 4 high-to-low transitions to NAND gate 91. NAND gate 91 is enabled by output $\overline{O}$ of divide-by-four circuit 95 being high, so it passes 4 consecutive pulses into divide-by-four circuit 95, the last of which changes the state of output O from low to high, representing 525 line standard reception.

Next the changeover of the circuit operation from Sync Pulse Reset Mode to Countdown Reset Mode when receiving 525 line standard will be described. As mentioned above, this changeover occurs after 4 consecutive matches between a 525 count in counter 60 and the vertical sync pulse. When this changeover occurs the M output of latch 94 changes state from a low logic level to a high logic level. Let us examine this changeover in detail by looking at the various logic levels occurring within the circuit for the condition when the 525 count of counter 60 occurs simultaneously with the vertical sync pulse.

Actually the match is made between the 525 count and the low-to-high transition of the $\overline{P}$ output of D flip-flop 55. The reason for clocking the vertical sync pulse into the D flip-flop 55 is to synchronize its transitions exactly with the C signal transitions. Since output $\overline{M}$ of latch 94 is high when output $\overline{P}$ of flip-flop 55 is high, NAND gate 92 output is low. The corresponding low input to AND gate 85 causes the output of gate 85 to remain low, which keeps AND gate 87 disabled so that divide-by-four circuit 93 is not reset at this time.

When counter 60 is at the 525 count, AND gate 83 goes high, since it is enabled by output O of divide-byfour circuit being high. The output of AND gate 83 is inverted by inverter 45 and applied to NAND gate 84. The other input to NAND gate 84 is high, since the output of AND gate 81, representing the 625 count, is low. Thus as counter 60 attains the 525 count, NAND gate 84 generates a positive pulse to the K stage of divide-by-four circuit 93, thus incrementing such count by one count.

When counter 60 leaves the 525 count the output of NAND gate 84 reverts to a low signal level which keeps AND gate 85 disabled and accordingly prevents resetting of divide-by-four circuit 93 over reset lead 98. Thus to summarize, as the circuit counts successive coincidences between the 525 count and the vertical sync pulse, each successive coincidence increments divide-by-four circuit 93 by one count until on the fourth successive coincidence output M of latch 94 is switched to a high logic level. All during the time these coincidences are being counted, the resetting of divide-by-four circuit 93 is inhibited. When the output M of latch 94 goes high, this indicates that the Countdown Reset Mode of operation has been attained, and it will take four successive non-coincidences to throw the circuit operation back to the Sync Pulse Reset Mode. It should be noted, however, that while the circuit is trying to attain the Countdown Reset Mode if there is a single non-coincidence between the 525 count and the vertical sync pulse, divide-by-four circuit 93 will be immediately reset, so that the circuit must start over again looking for 4 consecutive coincidences.

Now the operation of the circuit when receiving 525 line standard in the Countdown Reset Mode will be described. For these conditions, as mentioned above, output M of latch 94 is high, representative of the Countdown Reset Mode. Of course, output O of divide-by-four circuit 95 remains high, indicative of operation in the 525 line standard, in order to enable AND gate 83 to generate the 525 output. For the condition when the 525 count coincides with the vertical pulse (actually the low-to-high transition of output $\overline{P}$ of flip-flop 55), the output of NAND gate 84 is high, as is the output of NAND gate 92. Thus AND gate 85 generates a high level output to AND gate 87. At the same time NAND gate 86 generates a reset pulse over lead 98 to the K and L stages of divide-by-four circuit 93.

Thus, although divide-by-four circuit 93 is continually trying to increment by 1 with each coincidence of a 525 count with a $\overline{P}$ pulse, it is reset each time, so that the M output of latch 94 remains high, causing the circuit to remain in the Countdown Reset Mode as it should for these conditions. This operation represents the "normal" operational mode of the circuit when 525 line standard is being received.

When operating normally in the Countdown Reset Mode, the necessary vertical sweep signals are derived from counter 60 by appropriately tapping counter stages A–J as required. For example, when the circuit of the preferred embodiment is used with associated TV time base circuitry for which it was designed, the start of the ramp drive output begins with the reset pulse to the counter 60 and remains until a count of 16. Referring to FIG. 5A, the "RESET" pulse may be derived as an output from the conductor 96, and the count of "16" may be derived as an output from counter stage "E". The start of the blanking output starts as a count of 516 (or 616 if operating in a 625 line standard) and lasts until a count of 36. In FIG. 5A the "516" count and the "36" count may be derived by logically combining the appropriate outputs of the counter 60, essentially in the same manner as the "625", "576", and "525" counts.

A signal derived from the O output of divide-by-four circuit 95 indicates to appropriate circuitry within the TV receiver whether a 525 or 625 line standard is being received. In FIG. 5B, for example, the output signal designated "525/625 MODE" on conductor 103 indicates whether a 525 or 625 line standard is being received. Correspondingly, in FIG. 6 the "O" output of divide-by-four circuit 95 is shown as an output on conductor 105. Likewise, in FIG. 8 the number stored in latch 5 indicative of the line standard may be output over bus segment 110. This signal, for example, can provide chrominance decoding information, the 525 line standard being indicative of NTSC and the 625 line standard being indicative of PAL or SECAM. Also the 525/625 line standard output may be used to control the picture height, a slower ramp being required for 625 line standard operation.

In addition, provision may be made for locking the circuit in the Sync Pulse Reset Mode. This may be desirable under circumstances where non-standard TV transmission signals are received, for example from a video recorder or from certain non-standard TV broadcast transmissions.

In addition the circuit may be provided with an output derived from the M output of latch 94 to indicate either the Sync Pulse Reset Mode or the Countdown Reset Mode. This signal could be used, for example, to control the TV audio output. In Germany, for example, TV manufacturing regulations require that the TV audio be muted if the TV receiver is not receiving a valid TV picture, in order to prevent monitoring of police reports and the like over a TV receiver. Also this output could be used to bias the vertical sync input in the Countdown Reset Mode in order to provide a higher quality sync pulse input to the circuit.

Let us now consider what happens if the line standard changes to 625 when the circuit is operating in the Countdown Reset Mode while receiving 525 line standard.

The 525 count of counter 60 will no longer coincide with the $\overline{P}$ output of flip-flop 55. For example, assume that the 525 count is high from AND gate 83 and that the $\overline{P}$ output of flip-flop 55 is low. The P output of flip-flop 55 is high, causing NAND gate 86 to generate a low logic level to AND gate 87, so that the divide-by-four circuit 93 is no longer being reset during each counter cycle. Although the vertical sync pulse is now occurring much later (i.e. at a time corresponding to a count of 625 in the counter 60), until the circuit reverts to the Sync Pulse Reset Mode counter 60 will be reset by a count of 525 for at least 4 consecutive non-coincidences between the 525 count of counter 60 and the vertical sync pulse, which is now occurring at 625 line intervals. For each successive non-coincidence, the divide-by-four circuit 93 is incremented by 1, until on the fourth successive non-coincidence output M of latch 94 changes state from high to low, indicating that the counter operation has been thrown back to the Sync Pulse Reset Mode. However, if before output M changes state the line standard reverts to 525 and the circuit reachieves synchronization, the divide-by-four circuit 93 will be reset as described above, and the circuit operation will remain in the Countdown Reset Mode.

After the output M of latch 94 has gone high, the next time that counter 60 attains a count of 525, divide-by-four circuit 93 is reset. This occurs since output M of latch 94 is now providing a low level input to NAND gate 86, causing same to generate a high level input to AND gate 87. When the 525 count is reached, the output of AND gate 83 goes high, causing a low level output to be generated by inverter 45 to NAND gate 84. This in turn generates a high level input to AND gate 85. Since according to our assumption we are now receiving 625 line standard, at the moment counter 60 attains a count of 525, there should be no vertical sync pulse received on lead 53, so the $\overline{P}$ output of flip-flop 55 will be low, and the output of NAND gate 92 will be high, thus enabling AND gate 85. At the same time output P of flip-flop 55 is high, causing NAND gate 86 to generate a high level input to AND gate 87. Thus at the 525 count a high level signal is generated by AND gate 87 over lead 98 to reset stages K and L of divide-by-four circuit 93. At the same time the counter 60 is not reset. Both inputs to NAND gate 89 are high. The output M of latch 94 being low holds the output of NAND gate 88 high, while the $\overline{P}$ output of flip-flop 55 being low holds the output of NAND gate 92 high.

During the same count cycle under discussion, when counter 60 reaches a count of 576, AND gate 82 generates a high level signal over lead 99 to reset divide-by-four circuit 95. The O output of circuit 95 thus goes to a low signal level, inhibiting AND gate 83 from generating further high level signals so long as the circuit is operating in the 625 line standard. The same holds true for each successive operational cycle while the circuit is receiving 625 line standard, since each 576 count causes divide-by-four circuit 95 to be reset, so that its output O remains at a low signal level.

During the next count cycle of counter 60, the attainment of the 525 count has no effect, as mentioned above, since the low level signal at the output O of circuit 95 inhibits AND gate 83 from generating a high signal level. When counter 60 reaches a count of 576, divide-by-four circuit 95 is reset again as described above. When counter 60 reaches the 625 count we will assume that this occurs simultaneously with receipt by the vertical sync pulse on lead 53. The 625 count causes AND gate 81 to generate a high level signal which is inverted by inverter 43, causing NAND gate 84 to generate a high signal level input to divide-by-four circuit 93 to increment it by 1 count. The receipt of the vertical sync pulse at the same time causes the output $\overline{P}$ of flip-flop 55 to go high, causing NAND gate 92 to go low. Since the upper input to NAND gate 89 is being held by the low level M output of latch 94 applied to NAND gate 88, the output of NAND gate 89 goes high at this time. Since we have reached at least a count of 512, the output of stage J of counter 60 is high, enabling AND gate 90 to pass the high level output of NAND gate 89 as a high level signal over lead 96 to reset each stage A–J of counter 60.

For the next three cycles of counter 60 the same thing happens, assuming that during each cycle the vertical sync pulse occurs simultaneously with attainment of the 625 count by counter 60. On the fourth successful match between the 625 count and the vertical sync pulse, divide-by-four circuit 93 rolls over, and latch 94 is set to a high state. The output M of latch 94 being in a high state indicates that the circuit is now operating in the Countdown Reset Mode, wherein the resetting of counter 60 is occurring each time a count of 625 is reached. So long as the circuit continues to operate in the 625 line standard, counter 60 continues to be reset by the count of 625, and the divide-by-four circuit 93 continues to be reset, so that the output M of latch 94 remains in its high state.

We will now consider the situation where the circuit is operating in the 625 line standard and a vertical sync pulse is received prior to counter 60 reaching a 625 count. Should this happen, counter 60 is not reset by the early occurring vertical sync pulse. Also the divide-by-four circuit 93 is not reset. When the counter 60 reaches a count of 576, divide-by-four circuit 95 is reset as usual. When the counter 60 reaches the 625 count, counter 60 is reset, and divide-by-four circuit 93 is incremented by 1. If these conditions prevail for 4 successive cycles, divide-by-four circuit 93 will roll over, causing the output M of latch 94 to go low, indicating that the circuit operation has reverted to the Sync Pulse Reset Mode. Assuming that the earlier occurring vertical sync pulses represent a change to 525 line standard, each received vertical sync pulse will now cause counter 60 to be reset, such resetting occurring simultaneously with counter 60 reaching a 525 count. Since a count of 576 is no longer being attained, divide-by-four circuit 95 is no longer being reset during each counter cycle, so once the circuit operation reverts to the Sync Pulse Reset Mode, then 4 counters cycles later divide-by-four circuit 95 reaches an internal count of 4, causing its output O to go high. Output O being high indicates that the circuit is now again operating in the 525 line standard. Once output O goes high, AND gate 83 is once again enabled to generate a high signal level output for each count of 525 as mentioned above with reference to operation of the circuit in the Sync Pulse Reset Mode when receiving 525 line standard. Each successive cycle of counter 60 reaching a count of 525 causes the divide-by-four circuit 93 to increment by 1, until the output M of latch 94 goes high. During these 4 cycles counter 60 is reset each time by the vertical sync pulse received on line 53. However, when output M of latch 94 goes high, this indicates that the Countdown Reset Mode had again been reached, and from now on the counter 60 is reset by reaching a count of 525 so long as the circuit remains in the Countdown Reset Mode.

DESCRIPTION AND OPERATION OF ALTERNATIVE EMBODIMENT

Figure 8:
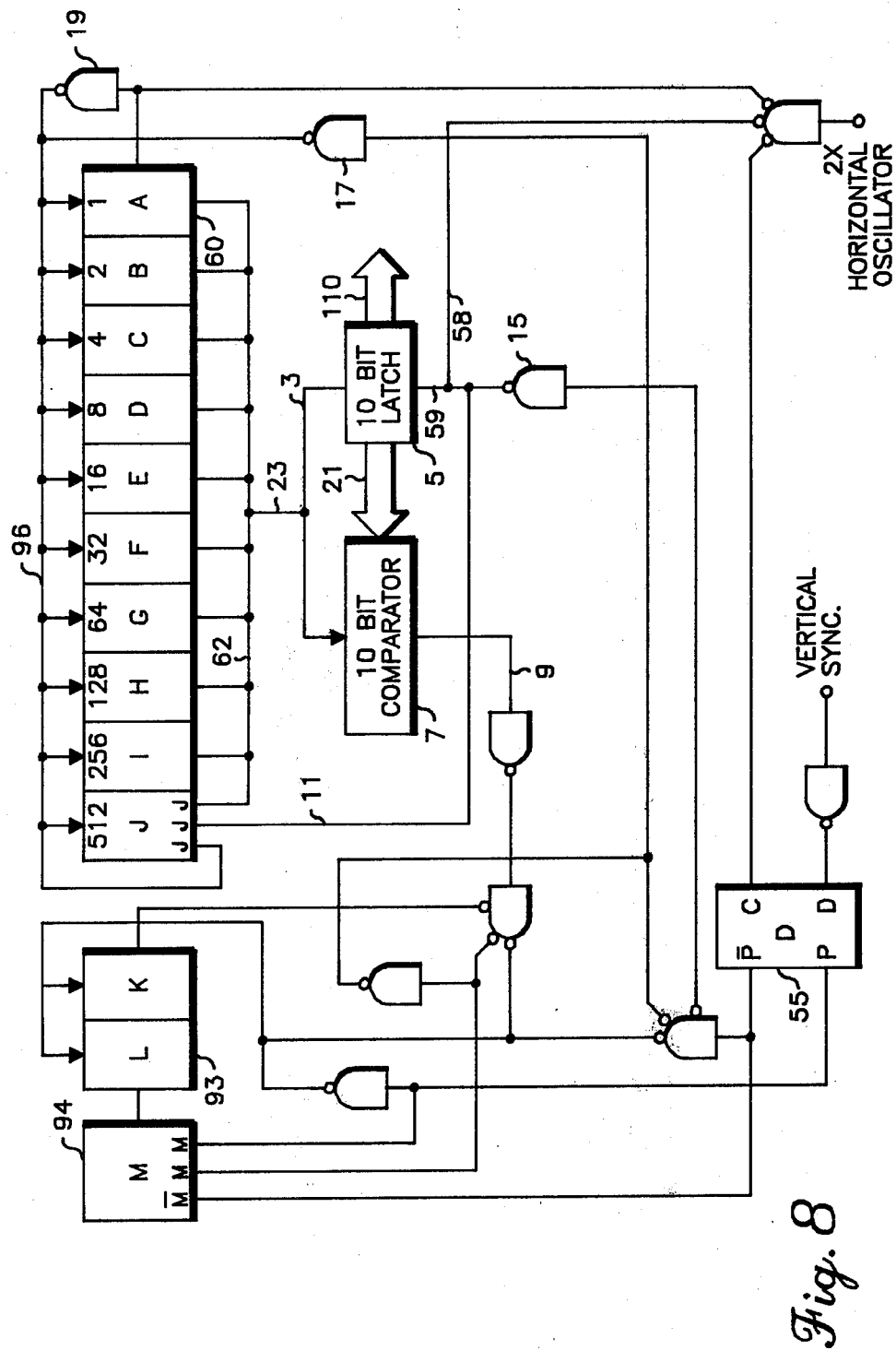
FIG. 8 illustrates a logic diagram of a vertical sync counter and associated logic for an alternative embodiment of the invention which is capable of automatically recognising any desired TV line standard.

FIG. 8 shows an I²L implementation of a vertical sync counter with automatic recognition of any given line standard.

That is, the vertical sync counter illustrated in FIG. 8 is capable of automatically recognising any line standard, regardless of the number of lines per picture. Instead of hard-wiring a particular count, i.e. 525 or 625, into the vertical sync counter circuit, the contents of stages A–J of counter 60 are concatenated and parallel-loaded over 10-bit busses 23 and 3 into 10-bit latch 5 at a moment determined by the vertical sync pulse, at least when the circuit is operating in the initial Sync Pulse Reset Mode. During subsequent counter cycles, the 10-bit contents of counter 60 is transferred into 10-bit comparator 7 via 10-bit bus 23. The contents of 10-bit latch is simultaneously transferred into 10-bit comparator 7 via 10-bit bus 21. Comparator 7 compares the 10-bit count of counter 60 with the contents of 10-bit latch 5 at the moment the vertical sync pulse is received, and if there is coincidence counter 60 is reset.

The conditions for loading the 10-bit latch 5 with the contents of counter 60 are the simultaneous presence of the sync pulse, the clock pulse C being high, and the J output of counter 60 being high. This AND function provides an enable pulse to the 10-bit latch 5 over lead 59, enabling the latch to be loaded with the contents of counter 60. Requiring the J output to be present limits the loading to line counts equal to or higher than 512 in the embodiment illustrated; however, this lower limit could be reduced by using an appropriate lower output from counter 60 as a condition for generating the enable pulse to 10-bit latch 5.

After counter 60 has been reset by 4 consecutive sync pulses, latch 94 changes state in the manner described above with reference to the preferred embodiment shown in FIGS. 5A and 5B. This means that the circuit has entered the Countdown Reset Mode, wherein counter 60 is reset during each cycle at the time the counter count is equal to the contents of 10-bit latch 5.

In essence, the universal line standard circuit illustrated in FIG. 8 is a self-programming system, since any line standard number equal or above the chosen lower limit can be automatically recognised by the circuit.

It will be apparent to those skilled in the art that the disclosed Vertical Sync Counter with Automatic Recognition Of TV Line Standard may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A vertical counter for a TV receiver having a horizontal oscillator for providing horizontal sync pulses which are coupled to at least said counter to be counted thereby:

said counter being adapted to provide output pulses to a vertical sweep generator, said counter being adapted to receive a vertical sync pulse, and sync pulse occurring in at least one of two frequencies, with respect to said horizontal sync pulses, at any given moment, wherein said vertical counter is characterised by having at least a first mode of operation wherein said counter counts to a first predetermined number of said horizontal pulses corresponding to reception of said vertical sync pulse at a first frequency, after which said vertical counter is reset, and having at least a second mode of operation wherein said counter counts to a second predetermined number of said horizontal pulses corresponding to reception of said vertical sync pulse at a second frequency, after which said vertical counter is reset, said vertical counter comprising means responsive to said horizontal pulses and to said vertical sync pulses for providing a change signal indicative of a change from reception at one frequency to reception at a different frequency, said vertical counter changing automatically between said first and second modes of operation in response to said change signal.

2. The vertical counter as recited in claim 1, wherein said second predetermined number is larger than said first predetermined number.

3. The vertical counter as recited in claim 1, wherein when said counter begins operating in either mode of operation said counter is reset automatically by said vertical sync pulse for a predetermined number of counter cycles whereupon said counter is thereafter reset by the count contained within said counter corresponding to the predetermined number of horizontal pulses associated with the particular mode of operation.

4. The vertical counter as recited in claim 3, wherein said counter is again reset by said vertical sync pulse for at least said predetermined number of cycles whenever said counter count fails to occur simultaneously with said vertical sync pulse for a second predetermined number of cycles.

5. The vertical counter as recited in claim 1 further comprising lock-out means for inhibiting comparison of the counter count corresponding to said first predetermined number with the receipt of said vertical sync pulse when said counter is operating in said second mode of operation.

6. The vertical counter as recited in claim 5, wherein said lock-out means is activated and kept activated by said counter attaining a count intermediate said first and second predetermined numbers during each cycle, when said counter is operating in said second mode of operation.

7. The vertical counter as recited in claim 1, wherein said counter comprises a chain of dividers.

8. The vertical count as recited in claim 1, wherein said counter can be synchronized to any number of vertical sync pulse frequencies between predetermined lower and upper limits.

9. The vertical counter as recited in claim 1 further comprising register means, said register means being loadable with a count number corresponding to the current vertical sync pulse frequency, said count number lying within a range of numbers the lower and upper limits of which are proportional to the lowest and highest sync pulse frequencies to which said counter is capable of being synchronized, said first and second frequencies lying within said range, and comparison means for comparing said count number to the count in said counter means, said counter means being reset when said counter counts to said count number.

10. The vertical counter as recited in claim 9, wherein when said counter begins operating in at least said first or second modes of operation said counter is reset automatically by said vertical sync pulse for a predetermined number of counter cycles whereupon said counter is thereafter reset by the count contained within said counter corresponding to said count number.

11. The vertical counter as recited in claim 1, further comprising means providing a mode signal for indicating whether said counter is operating in said first or said second mode of operation.

12. The vertical counter as recited in claims 3 or 10, further comprising means for providing a reset type signal for indicating said counter is being reset by said vertical sync pulse or by its own internal count.

13. The vertical counter as recited in claims 1 or 9, wherein said counter is formed as an integrated circuit.

* * * * *